(12) United States Patent
Trygg

(10) Patent No.: US 8,392,017 B2
(45) Date of Patent: Mar. 5, 2013

(54) APPARATUS AND METHOD FOR GROUPING UNITS

(76) Inventor: Lars Erik Trygg, Karlshamn (SE)

(*) Notice: Subject to any disclaimer, the term of this patent is extended or adjusted under 35 U.S.C. 154(b) by 452 days.

(21) Appl. No.: 12/665,907

(22) PCT Filed: Jul. 11, 2008

(86) PCT No.: PCT/SE2008/000446
§ 371 (c)(1),
(2), (4) Date: Dec. 21, 2009

(87) PCT Pub. No.: WO2009/011634
PCT Pub. Date: Jan. 22, 2009

(65) Prior Publication Data
US 2010/0198394 A1    Aug. 5, 2010

(30) Foreign Application Priority Data
Jul. 13, 2007 (SE) .................................. 0701715

(51) Int. Cl.
*G06F 7/00* (2006.01)
*G05B 15/00* (2006.01)
*B65H 3/00* (2006.01)
*B65H 29/00* (2006.01)
*B65G 57/22* (2006.01)

(52) U.S. Cl. ........ 700/230; 700/218; 700/217; 700/258; 700/213; 700/228; 414/796.9; 414/791.6; 414/791.4

(58) Field of Classification Search .................. None
See application file for complete search history.

(56) References Cited

U.S. PATENT DOCUMENTS

| 5,423,648 A * | 6/1995 | Akeel et al. ................ 198/468.2 |
| 6,055,462 A * | 4/2000 | Sato ............................. 700/217 |
| 7,643,901 B2 * | 1/2010 | Ponti et al. .................... 700/217 |
| 2010/0025516 A1 * | 2/2010 | Barsacchi .................. 242/533.2 |

FOREIGN PATENT DOCUMENTS

| DE | 1329241 | | 4/1967 |
| DE | 19731656 | | 1/1999 |
| DE | 19731656 C1 * | 1/1999 |
| EP | 1634827 | | 3/2006 |
| WO | 9710165 | | 3/1997 |
| WO | WO 9710165 A1 * | 3/1997 |

* cited by examiner

*Primary Examiner* — Gene Crawford
*Assistant Examiner* — Yolanda Jones
(74) *Attorney, Agent, or Firm* — Holland & Hart LLP

(57) ABSTRACT

Apparatus for grouping a number of units, such as packaging units, when palleting the units, comprising a feed belt for conveying the units (10) and a grouping belt, which defines a grouping plane, said feed and grouping belts being driven for movement parallel to one another, and a robot, which is designed to group the units by positioning and orienting the units on the grouping plane. At least one part of the feed belt (1) runs beside and adjacent to the grouping belt (2). The robot (3) is a multi-axial industrial robot having a robotic arm on which a pusher element (5) is arranged, rotatable about an axis (6) perpendicular to the grouping plane, in order to allow the transfer of at least one unit from the feed belt to the grouping belt under a pushing action supplied by the pushing element, together with orientation and positioning of the unit on the grouping belt.

12 Claims, 1 Drawing Sheet

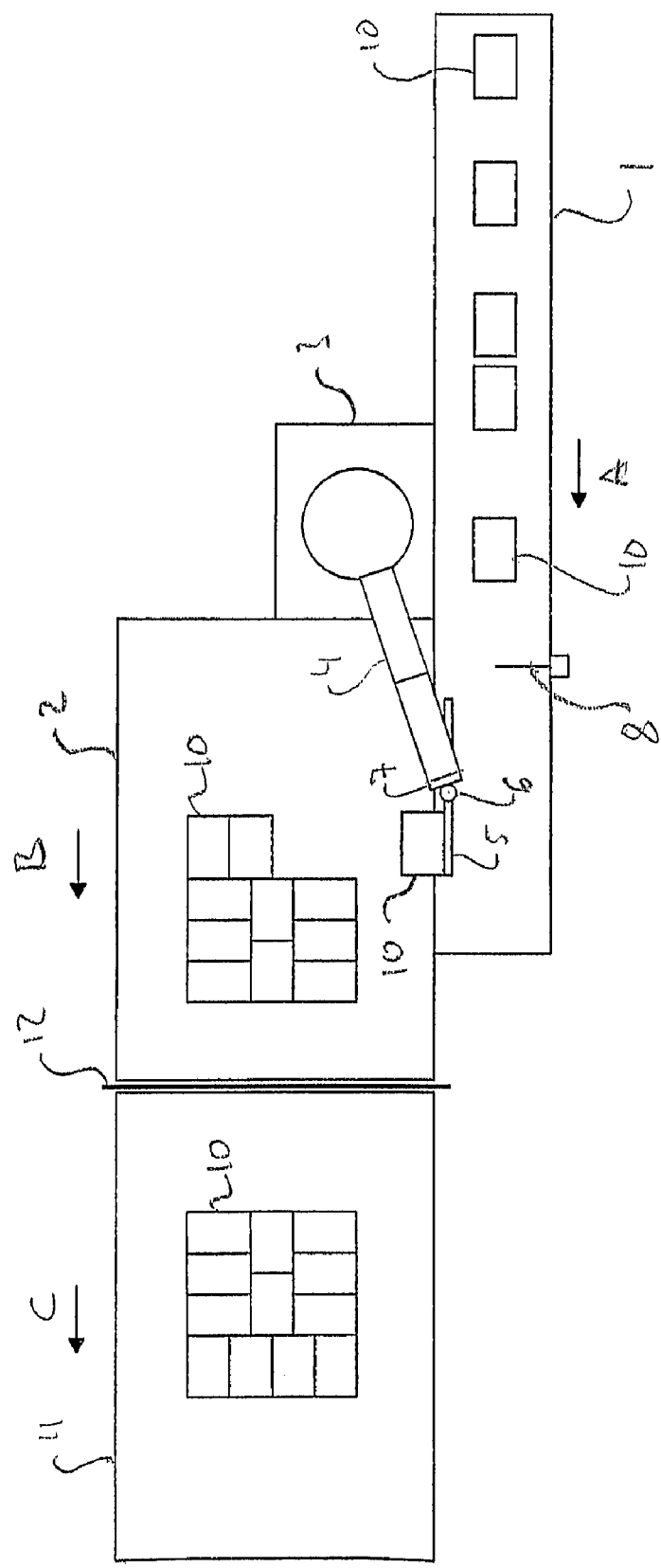

APPARATUS AND METHOD FOR GROUPING UNITS

FIELD OF THE INVENTION

The invention relates to an apparatus and a method for grouping units, such as packaging units, for the palleting of these units.

BACKGROUND OF THE INVENTION

In many different manufacturing industries the manufactured goods are packaged in packaging units, such as cartons, for example, which are then placed on load pallets for onward transport. Such placing of packaging units on a load pallet is often termed palleting. Several layers of packaging units are usually stacked on top of one another on each pallet.

In order to make optimum use of the space on a load pallet, each layer of packaging units is first grouped before the layer is lifted onto the pallet. Such grouping means that each packaging unit is given a specific position and orientation relative to each other packaging unit in each layer.

In order to give the stack of packaging units on the loaded pallet good stability, each adjoining layer should have a different grouping configuration, so that packaging units in the one layer bear against more than one packaging unit in the other layer. This creates a frictional interlock between the layers, which helps to prevent the stack falling apart.

In many industries, such as the brewery industry, for example, with large production flows, it is very important that the palleting and grouping of packaging units can be carried out at high speed, since these factors otherwise limit the speed of the entire production process.

DESCRIPTION OF THE PRIOR ART

Creating an automated transfer of packaging units from one conveyor belt to another, for distribution or sorting purposes, for example, is already known. DE 197 31 656 C1 describes an apparatus by means of which such a transfer of packages from a first to a second conveyor belt can be achieved automatically, in order to distribute or sort out individual packages. The apparatus described in this document comprises a triaxial, parallel transfer machine, which by means of a reciprocating rotational movement of an arm causes a feed plate to reciprocate between a first and a second conveyor belt, the feed plate being kept constantly parallel to the common axis of movement of the conveyor belts. This apparatus thus makes it possible to transfer packages parallel from one belt to another, but the apparatus cannot be used to group multiple adjacent packages or to orient individual or multiple packages.

Also previously known is the use of automated grouping of packaging units. Such an automated grouping station usually comprises a narrower feed belt, which is arranged in line with and connected to a broader grouping belt. Both belts are driven in a common direction and the feed belt connects to the grouping belt in the middle of the upstream end of the grouping belt. The packaging units to be grouped are placed on the feed belt, which conveys them in series up onto the grouping belt via the joint between the two belts. On the grouping belt a grouping operation then occurs in which each packaging unit is assigned a predetermined orientation and positioning relative to the other packaging units, which are intended to form one and the same pallet layer. Once the packaging units have been grouped, the grouping belt conveys the group onwards to a transfer apparatus, such as a lifting robot, for example, which moves the group over to a load pallet as one stacking layer.

In a previously known apparatus and method for such grouping, a number of axially moveable arms are arranged in series along one or both sides of the grouping belt, so that they can move in a straight line, at right angles to the direction of movement of the grouping belt. When the grouping belt conveys the packaging units forwards, the arms can be controlled so that at predetermined positions they exert pressure on vertical side walls of the packaging units, so as to thereby displace the units laterally or to turn the units about a vertical axis, so that they assume a desired orientation and position relative to one another in a lateral direction. In order for the units to assume a desired position in the feed direction, the arms or separate arresting elements are introduced in front of the foremost units in a group, so that these are braked, the units following these being carried forward until they bear against the units in front.

In another known apparatus and method for grouping, the axially moveable arms are replaced by a portal robot, which is arranged at the upstream end of the grouping belt. The portal robot carries a gripper tool, which is capable of rotating about a vertical axis and is moveable parallel and at right angles the direction of movement of the grouping belt. In grouping packaging units fed to the grouping belt, the gripper tool grips around the side walls of each individually fed packaging unit, lifts the unit, orients it by turning it about the vertical axis and carries it to a predetermined position on the grouping belt, where the unit is lowered and released by opening of the gripper tool. Since the gripper tool grips around the side walls of the packaging unit, in this arrangement some clearance occurs between adjoining packaging units when the tool releases its grip. Once the portal robot has achieved an approximate grouping, therefore, the group undergoes a compression operation, in which compression elements that can be pushed inwards from the side laterally compress the group and an arresting element, for example, of the type described above, ensures compression of the group in the direction of movement of the belt.

SUMMARY OF THE INVENTION

An object of the invention is to provide an improved apparatus and method for grouping packaging units. A particular object is to provide such an apparatus and method which with relatively few moving parts will facilitate reliable grouping with high precision at high speed.

These and other objects are achieved by an apparatus of the type specified in the preamble to patent claim 1 and which has the features specified in the characterizing part of the claim. The apparatus is intended for grouping a number of units, such as packaging units, when palleting the units, and comprises a feed belt for conveying the units and a grouping belt which defines a grouping plane, said feed and grouping belts being driven for movement parallel to one another, and a robot, which is designed to group the units by positioning and orienting the units on the grouping plane. According to the invention, at least one part of the feed belt runs beside and adjacent to the grouping belt. The robot is a multi-axial industrial robot having a robotic arm on which a pusher element is arranged, rotatable about an axis perpendicular to the grouping plane, in order to allow the transfer of at least one unit from the feed belt to the grouping belt under a pushing action supplied by the pushing element, together with orientation and positioning of the unit on the grouping belt.

With the apparatus according to the invention the grouping is performed by a single moving robotic arm, which both orients and positions each packaging unit relative to the moving grouping belt and the other units in each prepared group. The invention allows the number of separately controlled and moving parts to be considerably reduced, compared to previously known arrangements with axially moveable arms arranged in series. The invention moreover means that the length of the grouping belt along which the grouping occurs can be reduced considerably, which among other things reduces the overall space taken up by the apparatus.

Compared to the previously known arrangement with a gripper tool, which is arranged on a portal robot, the invention primarily has the advantage that the pusher element can directly push each unit to its ultimate position in the group. The fact that the movement and orientation of each unit is performed by pushing from the side of the grouping belt obviates the need for gripper tools, which would otherwise require the units to be placed with a certain clearance between them to allow for opening of the gripper tool. With the invention, on the other hand, each unit in a group can be oriented and positioned in its ultimate position within the group solely by means of the pusher element arranged on the robotic arm. Nor does the invention require any lifting or lowering of the units, which reduces the total number of movements that have to be performed by the robot. This in turn allows each orientation and positioning of a unit to be performed more rapidly than hitherto, so that the total time taken to perform the grouping is reduced.

In the previously known arrangement with a lifting portal robot problems also arise in the event that the grouping operation has to be interrupted, for example because a unit is damaged. Once the damaged unit has been removed, the gripper tool must then be manually controlled, in order to grasp a new unit, and then brought back to the position in which the operation was interrupted, in order to be restarted there. With the apparatus and the method according to the invention, on the other hand, the damaged unit can be directly exchanged manually in the position of the pusher element where the interruption occurred, following which the operation can be directly restarted from this position.

With the apparatus and the method according to the invention it is also possible to perform the grouping under a constant forwarding movement of the grouping belt. This firstly helps to reduce the time taken for grouping and moreover facilitates the control of a succeeding palleting robot, which lifts each grouped layer of units over to a waiting pallet.

The apparatus suitably comprises means for measuring or determining the speed of the grouping belt, which means are connected to a robot control unit for controlling the movements of the robot in relation to the speed of the grouping belt. For example, a pulse generator, which emits signal pulses in proportion to the rate of advance of the grouping belt, may be connected to the robot control unit. Among other things, this allows very good coordination of the robot movements, regardless of what speed the grouping belt is driven at.

The apparatus may suitably comprise a detector, which is arranged next to the feed belt in order to detect that a unit has assumed a predetermined position on the feed belt. The detector delivers a control signal to the robot control unit when the packaging unit has assumed the predetermined position, the control signal serving to trigger the robot grouping movement for the unit in question. This enables the movement of the robotic arm to be coordinated with the movement of the feed belt, so that the speed of the feed belt can be allowed to vary without adversely affecting the grouping result.

In order to allow a further increase in the speed of movement of the robotic arm and/or greater precision in movement of the robotic arm and/or greater precision in the positioning of units on the grouping belt, a suction device may be arranged on the pusher element for detachably holding at least one unit against the pusher element. This serves to prevent the units, due to their kinetic energy, sliding past their intended position in which the pusher element ceases the pushing movement. The suction device is accordingly activated for holding the unit against the pusher element at least during retardation of the movement of the pusher unit, but is disengaged so that the unit is released from the pushed unit when the unit has assumed its correct position on the grouping belt.

In order to allow a further increase in the grouping speed and the speed of movement of the pusher element, the apparatus may comprise an arresting element, which can be introduced into the moving path of the grouped units downstream of the area of the grouping belt where the grouping takes place. This allows the pusher element to position the units in a group with a lesser precision, especially with regard to the positioning of units relative to the direction of movement of the grouping belt. It is therefore possible to allow the units to be positioned with a certain interval in the direction of movement of the grouping belt. By causing the arresting element to block the forward movement of the grouped units, the succeeding units behind the foremost units are then advanced by the grouping belt, until they come to bear against the units in front. This is a simple and time-saving way of imparting a final grouping with great positioning accuracy to the group that was initially grouped with no great precision by the robot.

The invention also relates to a method for grouping units such as packaging units. The method according to the invention achieves corresponding objects and advantages to those specified above. Further objects and advantages of the invention are set forth in the description below and in the patent claims.

BRIEF DESCRIPTION OF THE DRAWINGS

A detailed exemplary description of the invention is given below with reference to the drawing attached, which consists of a schematic plan view from above of an apparatus according to the invention.

DETAILED DESCRIPTION OF AN EMBODIMENT

FIG. 1 illustrates schematically an apparatus according to an exemplary embodiment of the invention. The apparatus comprises a feed belt 1, which is driven at a constant speed A in a first direction. A grouping belt 2 is driven at a constant speed B in a direction which is parallel to the direction of movement of the feed belt 1. The belts 1 and 2 are arranged so that a downstream end of the feed belt 1 is arranged beside and adjacent to the near side of an upstream end of the grouping belt 2. The upper sides of both belts 1, 2 are arranged in substantially the same plane, which is here referred to as the grouping plane and which in the example shown is horizontal. A six-axis industrial robot 3, having a robotic arm 4, is arranged at the inside corner formed by the side of the feed belt 1 facing the grouping belt and the upstream end of the grouping belt. A pusher element 5 in the form of an elongated rail is arranged at the free end of the arm. The pusher element 5 is rotatably attached to the robotic arm 4 by means of an articulated joint 6, which is in turn arranged on the arm so that it can rotate about a horizontal axis 7. The articulated joint 6 defines an axis of rotation, which is substantially perpendicular to the longitudinal axis of the pusher element 5 and which can be kept perpendicular to the grouping plane, that is to say in a vertical position, through turning of the articulated joint 6 about the axis 7. In this way it is possible to drive the robotic arm to move over the feed and grouping belts 1, 2, whilst the longitudinal axis of the pusher element 5 is kept substantially parallel to the grouping plane and whilst the pusher element 5 simultaneously rotates about a vertical axis. As is usual in the case of industrial robots, the moving parts of the robot are capable of moving independently of one another about their respective axes. The pusher element 5 can thereby rotate about the vertical axis independently of the movement of other parts of the industrial robot. This in turn allows the packaging units moved by the pusher element 5 to be transferred from the feed belt to the correct position on the grouping belt whilst being simultaneously oriented by turning.

In the example shown a detector 8 in the form of a rocker contact with an antenna is fixedly arranged at a predetermined position along the feed belt.

In grouping of the packaging units, which in the example shown consist of cartons, the packaging units 10 are placed continuously one after the other on the feed belt 1, at the upstream end thereof. The packaging units 10 are fed continuously at a continuous speed A towards the detector 8. When a packaging unit comes into contact with the antenna, the detector sends a signal to the control unit (not shown) of the robot 3, which signal triggers the robot, causing it to initiate a grouping movement for the packaging unit in question. The ultimate orientation and position on the grouping belt for each packaging unit in the relevant grouping configuration is stored in the control unit.

The robotic arm is now brought so that the pusher element will come to bear against the outside of the packaging unit in question facing away from the grouping belt. The robotic arm is then driven to perform a grouping movement, during which the packaging unit is pushed along, resting on the upper side of the feed belt and the grouping belt. During this grouping movement the pusher element 5 is rotated about the vertical axis, so that the packaging unit assumes the desired orientation on the grouping belt.

A prepared group of packaging units is shown on the left of the drawing and a group in the process of grouping on the right. As will be seen from the drawing, each packaging unit can be rotated to orient it parallel or at right angles to the initial orientation which the packaging unit has on the feed belt 1. It will be appreciated, however, that through turning of the pusher element each packaging unit can be given any desired orientation on the grouping belt 2. The packaging unit in question is in this way pushed right into its ultimate position relative to the other packaging units in the same group. When the packaging unit has assumed its correct position, the pusher element can return directly to its starting position in proximity to the detector 8, in order to start a new grouping movement when the next packaging unit reaches the detector 8. It will be appreciated, therefore, that the pusher element 5 does not normally need to be raised above its working height in relation to the grouping unit. This means that the number of movements for the robot and hence the time taken for each grouping movement can be kept low, in order to thereby minimized the overall grouping time and to maximize the throughput speed of the packaging units.

During the grouping of a total of twelve packaging units in the example shown, into each group constituting a pallet layer, the grouping belt moves at a constant speed. It is therefore possible to control the grouping movement of the robotic arm starting from the nominal speed of the grouping belt. For greater precision and in order to allow deviations from the nominal speed of the grouping belt, however, it is desirable to control the movement of the robotic arm in relation to the actual instantaneous speed of the grouping belt. The robot control unit is therefore connected to a pulse generator, which continuously supplies the control unit with information on the actual speed of the grouping belt.

Once all the packaging units in a group have been positioned and oriented to their correct position, the completed group is conveyed onwards by the grouping belt. In an embodiment not shown, a palleting robot, having a gripper element, for example, which grips around at least two opposite facing sides of the group, may be arranged at the downstream end of the grouping belt. The palleting robot then tracks the movement of the group with the grouping belt and grasps the group, and lifts it over to a pallet placed close to the grouping belt.

In the example shown in the drawing, however, a further conveyor belt 11 is arranged downstream of and in line with the grouping belt 2. The conveyor belt 11 is driven at a speed C, which in the example shown is the same as the speed B of the grouping belt. The conveyor belt 11 is arranged at a short distance from the grouping belt 2, leaving a relatively small gap which can easily be negotiated by a completed group of packaging units that is being carried from the grouping belt to the conveyor belt. An arresting element 12 in the form of a guide bar is arranged in the gap so that it can be raised and lowered. By raising the arresting element 12, so that it protrudes above the grouping plane, it is possible to brake a group being advanced by the grouping belt, in that the foremost packaging units in the group come to bear against the arresting element. The arresting element may be activated, for example, in order to create a sufficient interval between two succeeding groups on the conveyor belt, so that a palleting robot arranged next to the conveyor belt can take charge of the first group without the risk of colliding with the next group following. The arresting element may also be used, however, to straighten up or finely adjust the grouping of a group that has not been grouped so precisely on the grouping belt. When the foremost packaging units are braked by contact against the arresting element 12, the succeeding packaging units, which may have been positioned at a certain interval from the packaging units in front, will be carried by the feed movement of the grouping belt until they bear against the packaging units in front. Any undesirable interval between the packaging units in a group in the direction of movement of the grouping belt is thereby eliminated.

Should the packaging units have a rectangular cross section parallel to the grouping plane, the rectilinear arresting element will also serve to true up any skewed packaging units in the group. The arresting element can in this way be used to increase the grouping speed, since the precision with which the packaging units are oriented and positioned on the grouping belt can be reduced, which allows an increased speed of movement of the robotic arm.

In order to further allow an increased grouping speed and/or to permit the orientation and positioning of packaging units on the grouping belt, the pusher element may be provided with suction devices, which are activated when the pusher element is pushing packaging units. The packaging units are consequently held firmly against the pusher element by means of a vacuum. This serves partly to prevent the packaging units sliding parallel and relative to the pusher element, and partly to prevent the packaging units, due to their inertia, sliding past their intended position when the pusher element slows down.

Exemplary embodiments of the invention have been described above. It will be appreciated, however, that the invention is not limited to this description but that it can be freely modified without departing from the scope of the following patent claims. For example, if so desired and where suitable, more than one packaging unit can be simultaneously oriented and positioned by means of the pusher element during a grouping movement performed by a robotic arm. As will be seen from the drawing, two succeeding groups can be grouped into two different grouping configurations by means of the apparatus and the method according to the invention. It will further be appreciated that the apparatus and the method according to the invention allow the grouping of packaging and other units of greatly varying geometries and sizes and that the grouping configurations into which the units are grouped can also be varied within very wide limits.

The invention claimed is:

1. An apparatus for grouping and palletizing a number of packaging units, comprising:
   a feed belt for conveying the units;
   a grouping belt;
   said grouping belt defines a grouping plane;
   wherein said feed and grouping belts are driven for movement parallel to one another;
   a robot which groups the units by positioning and orienting the units on the grouping plane;
   wherein at least one part of the feed belt runs beside the grouping belt
   wherein the robot is a multi-axial industrial robot comprising a robotic arm on which a pusher element is arranged;
   wherein the pusher element is rotatable about an axis perpendicular to the grouping plane;
   wherein the rotation of the pusher element about said axis is independent of rotation about the other axes of the multi-axial industrial robot;
   wherein the pusher element allows the transfer of at least one unit from the feed belt to the grouping belt under a pushing action while orienting and positioning the unit on the grouping belt.

2. The apparatus as claimed in claim 1, comprising means for measuring the speed of the grouping belt, said means being connected to a control unit for the robot for controlling movements of the robot in relation to the speed of the grouping belt.

3. The apparatus as claimed in claim 1, comprising a detector, which is arranged next to the feed belt for detecting that a unit has assumed a predetermined position on the feed belt.

4. The apparatus as claimed in claim 1, comprising a suction device, which is arranged next to the pusher element for detachably holding at least one unit against the pusher element.

5. The apparatus as claimed in claim 1, comprising an arresting element, which is insertable into the moving path of the grouped units.

6. A method of grouping and palletizing a number of packaging units, comprising the steps of:
   conveying the units by means of a feed belt and a grouping belt;
   said grouping belt defines a grouping plane;
   wherein the grouping belt is driven to move parallel to the feed belt;
   wherein the units are grouped by means of a robot by positioning and orienting the units on the grouping plane;
   wherein the feed belt conveys the units beside the grouping belt;
   rotating a pusher element that is arranged on an arm of a multi-axial industrial robot about an axis perpendicular to the grouping plane;
   wherein rotation of the pusher element is independent of rotation about the other axes of the multi-axial industrial robot; and
   pushing by the pusher element at least one unit from the feed belt onto the grouping belt such that the pusher element orients and positions the unit on the grouping belt.

7. The method as claimed in claim 6, wherein the movements of the robot are controlled in relation to the speed of the grouping belt.

8. The method as claimed in claim 6, comprising detecting that a unit has assumed a predetermined position on the feed belt.

9. The method as claimed in claim 6, comprising detachably holding at least one unit against the pusher element by means of a suction device.

10. The method as claimed in claim 6, comprising arresting the grouped units on the grouping belt by means of a movable arresting element whilst the grouping belt continues to be driven.

11. The method as claimed in claim 6, wherein the grouping belt is driven at constant speed.

12. The method as claimed in claim 6, wherein the feed belt is driven at constant speed.

* * * * *